US006082583A

United States Patent [19]

Bussell et al.

[11] Patent Number: 6,082,583

[45] Date of Patent: Jul. 4, 2000

[54] DEVICE AND METHOD FOR PROVIDING LIQUID TO A USER'S MOUTH

[75] Inventors: Barry T. Bussell, Royersford; Elbert K. Mackenzie, deceased, late of North Wales, by Rose T. MacKenzie legal representative; Linda E. Roseman, Philadelphia; William R. Conway, Elkins Park, all of Pa.

[73] Assignee: Belmont Housing Corporation, Philadelphia, Pa.

[21] Appl. No.: 08/832,946

[22] Filed: Apr. 4, 1997

(Under 37 CFR 1.47)

[51] Int. Cl.[7] .................................................. G01F 11/00

[52] U.S. Cl. .......................... 222/1; 222/175; 222/464.1; 222/527; 220/739; 224/407; 224/926; 248/230.5; 248/311.2

[58] Field of Search ............................... 222/1, 175, 180, 222/464.1, 527; 220/737, 739; 224/148.2, 407, 414, 448, 558, 926; 248/230.5, 309.1, 311.2

[56] References Cited

U.S. PATENT DOCUMENTS

| | | | |
|---|---|---|---|
| 4,141,524 | 2/1979 | Corvese, Jr. | 248/70 |
| 4,749,112 | 6/1988 | Harper | 224/42.45 R |
| 5,143,335 | 9/1992 | Frankel | 248/215 |
| 5,249,702 | 10/1993 | Topp et al. | 224/926 |
| 5,251,777 | 10/1993 | McMahon | 220/480 |
| 5,265,769 | 11/1993 | Wilson | 222/175 |
| 5,301,858 | 4/1994 | Hollander | 224/148.2 |
| 5,301,860 | 4/1994 | Paczonay | 224/414 |
| 5,358,142 | 10/1994 | Holmes | 222/1 |
| 5,449,206 | 9/1995 | Lockwood | 285/261 |
| 5,464,183 | 11/1995 | McConnell et al. | 248/311.2 |
| 5,465,885 | 11/1995 | Wyatt | 224/148 |
| 5,509,551 | 4/1996 | Terrell, II | 215/229 |
| 5,522,527 | 6/1996 | Tsai | 224/448 |
| 5,597,148 | 1/1997 | Gospodarich | 248/230.5 |
| 5,695,090 | 12/1997 | Burdick | 220/739 |
| 5,740,940 | 4/1998 | Weiss | 220/739 |

OTHER PUBLICATIONS

LOC–Line® The Original Modular Hose System brochure, 10 pages.

The Watering Hole, descriptions of Seirus Belt Flasque and Ultimate Stratus Torso Pak, 1 page.

The Swiggle™ Drinking System, Edstrom Industries, Inc., Waterford, WI, 4 pages.

Snap–Lock Sip–N–Puff, 1 page description and price list.

The Drink–Aide—Adaptive Independent Drinking Equipment, 1 page summary of product and 1 page of instructions.

Beverage Container Holder, Raco–USA, Inc., 1 page advertisment including installation instructions.

Enabling Devices switch mounting hardware, (hardware to position switches on the wheelchair and at the workstation), 1 page listing of products and prices.

*Primary Examiner*—Joseph A. Kaufman
*Attorney, Agent, or Firm*—Woodcock Washburn Kurtz Mackiewicz & Norris, LLP

[57] ABSTRACT

A device and method for enabling a user to draw upon a liquid contained within the device includes a container, a holder for fastening the container to a principal apparatus, a conduit for carrying liquid, and a support for rigidly supporting the conduit in a variety of positions adjacent the user's mouth. The method includes providing the device, fastening the device to the principal apparatus in a manner that resists vibration, and positioning an outlet of the conduit adjacent to the user's mouth so as to enable the user to drink with only slightly moving his head or mouth. Therefore, the device and method may be employed to enhance independence of persons with disabilities, among other uses.

21 Claims, 4 Drawing Sheets

DEVICE AND METHOD FOR PROVIDING LIQUID TO A USER'S MOUTH

FIELD OF THE INVENTION

The present invention relates to a device and method for providing liquid to a user's mouth. More specifically, the present invention relates to a device and method for enabling a person to drink liquid from a container after initial positioning of the device.

BACKGROUND OF THE INVENTION

Drinking an adequate amount of liquid is beneficial to human health, especially skin health and skin healing, and diminishes the frequency of urinary tract infections. However, drinking liquids is often problematic for a person with diminished control of his arms or hands, such as a quadriplegic. Such a disabled person, who might be confined to a bed or wheelchair, often is unable to move his arms, let alone to grasp and position objects with his hands. An attendant, therefore, must regularly physically assist the disabled person to enable him to consume an adequate amount of liquid. Typically, the attendant must position a tube adjacent the user's mouth and hold the tube while the disabled person draws the liquid through the tube and drinks. Needing the attendant's assistance to drink restricts the disabled person's independence, uses the attendant's time, and incurs costs. Furthermore, disabled persons are often subject to urinary tract infections and decubitus ulcers that may be caused by inadequate hydration.

There is a need for a drinking device that may be mounted to or near a disabled person's bed or wheelchair and that enables the disabled person independently to access and drink from a source of liquid by making small movements of his head or mouth. There is also a need for a device that enables the user to take a drink therefrom despite significant jolts and bumps that may be applied to the device as the user goes about his daily routine on a wheelchair.

A prior art device that is directed to such a need is the SWIGGLE DRINKING SYSTEM ("SWIGGLE") produced by Edstrom Industries, Inc., Waterford, Wis. The SWIGGLE includes a container, tubing connected to the bottom of the container, and a drinking valve. Resembling a rabbit feeder, the SWIGGLE's liquid flows from the container to the valve by gravity, which unfortunately requires that the container be located higher than the user's mouth. Thus, wheelchairs often must be equipped with additional tall structure to support the SWIGGLE container. Also, spills and leaks, if any, that may drip from the SWIGGLE may strike the user, thus, wasting the liquid and causing discomfort and embarrassment to the user.

The SWIGGLE device may also be equipped with flexible tubing. However, the SWIGGLE's flexible tubing lacks adequate support for keeping the valve in a fixed position adjacent the user's mouth. Whenever the SWIGGLE is jolted, for example when a wheelchair bumps into a wall, the flexible tube is jolted and knocked from its desired position with the result that the user is precluded from taking a drink. This is a substantial disadvantage if the device is placed on a wheelchair or similar apparatus, and therefore subject to significant forces and jolts as the wheelchair is moved about and bumps into furniture and walls.

Another device, the SIP-N-PUFF, supplied by Therafin Corporation, 19747 Wolf Road, Mokena, Ill. 60448, also uses a tube that is positioned adjacent a user's mouth. However, the SIP-N-PUFF does not carry liquid and is not a drinking device. Rather, the SIP-N-PUFF enables control of a wheelchair by using, for example, LOC-LINE segments, described hereinbelow, to convey air pressure from the user's mouth to a pneumatic switch. Specifically, the user inhales and exhales into the tube to actuate the pneumatic switch.

Another device, shown in FIG. 4 ("Prior Art") and FIG. 5, that addressed some of these problems comprised a cylindrical container 116 with a lid 118, a rigid tube 120 immovably fixed to the lid 118, and numerous ball and socket type, LOC-LINE segments 122 that are successively coupled together and coupled to the rigid tube 120. The device also included a flexible tube 124 that extends from a liquid 126 within the container 118 through a continuous passage formed by the rigid tube 120 and the segments 122. The device was able to be attached to a principal apparatus, such as a wheelchair, by a mounting clamp 128 that is attached to the rigid tube. The clamp 128 comprised an elongate bar 130 formed into a loop 132 on one end and having several holes 134 for accepting a U-shaped bracket 136. The clamp 128 was able to affix the device to a principal apparatus by screwing nuts 138 onto threaded ends of the U-shaped bracket 136. The holes 134 in the elongate bar 130 enable a bolt 140 to tighten the loop 132 around a knob 142 located on the rigid tube 120. Unfortunately, the clamp 128 permitted the device to easily shift from its desired position when the principal apparatus was vibrated or bumped. Moreover, because container 116 was supported only by hanging with screw threads from lid 118, container 116 was subject to unintended separation therefrom, especially if vibrated or improperly affixed by an attendant. Such separation caused container 116 to fall from the remainder of the device, and to spill liquid 126. Also, attendants must exercise greater care with this device because of the danger of unintended separation of lid 118 and container 116.

It is an object of the present invention to provide a drinking device that enables the user to draw upon liquid by suction; that may be mounted to a disabled person's bed, wheelchair, or other apparatus, or even a wall; that may be disposed either higher or lower than the user's mouth; that fixes the tubing configuration and outlet point at a variety of adjustable positions; that has a container that is easier for an attendant to securely install and remove; that directly supports the container rather than indirect support through the lid; and that maintains the tubing at a fixed position despite being vigorously vibrated and bumped.

SUMMARY OF THE INVENTION

In order to achieve the above and other objects of the invention, a drinking device that enables a user to draw upon liquid by suction is provided. The drinking device comprises a container, a holder and a fastening member, a conduit, and conduit support means. The conduit extends from the container, which holds the liquid, and through the support means. The holder and fastening member couple the container to a principal apparatus, such as a wheelchair, bed, intravenous pole, bicycle, or wall. The support means support the conduit in an infinite variety of adjustable positions. Thus, an outlet of the conduit may be positioned adjacent the user's mouth so as to enable the user to access the outlet with only slight movement of his head or mouth. The holder, fastening member, and support means work together to maintain the conduit outlet position despite significant forces and jolts that may be applied to the device.

A method of providing liquid to the user's mouth is also provided. The method comprises the steps of providing the device that enables the user to draw upon the liquid within the container, fastening the device to the principal apparatus, and rigidly positioning the outlet of the device adjacent the user's mouth.

DESCRIPTION OF A PREFERRED EMBODIMENT

Figure 1:
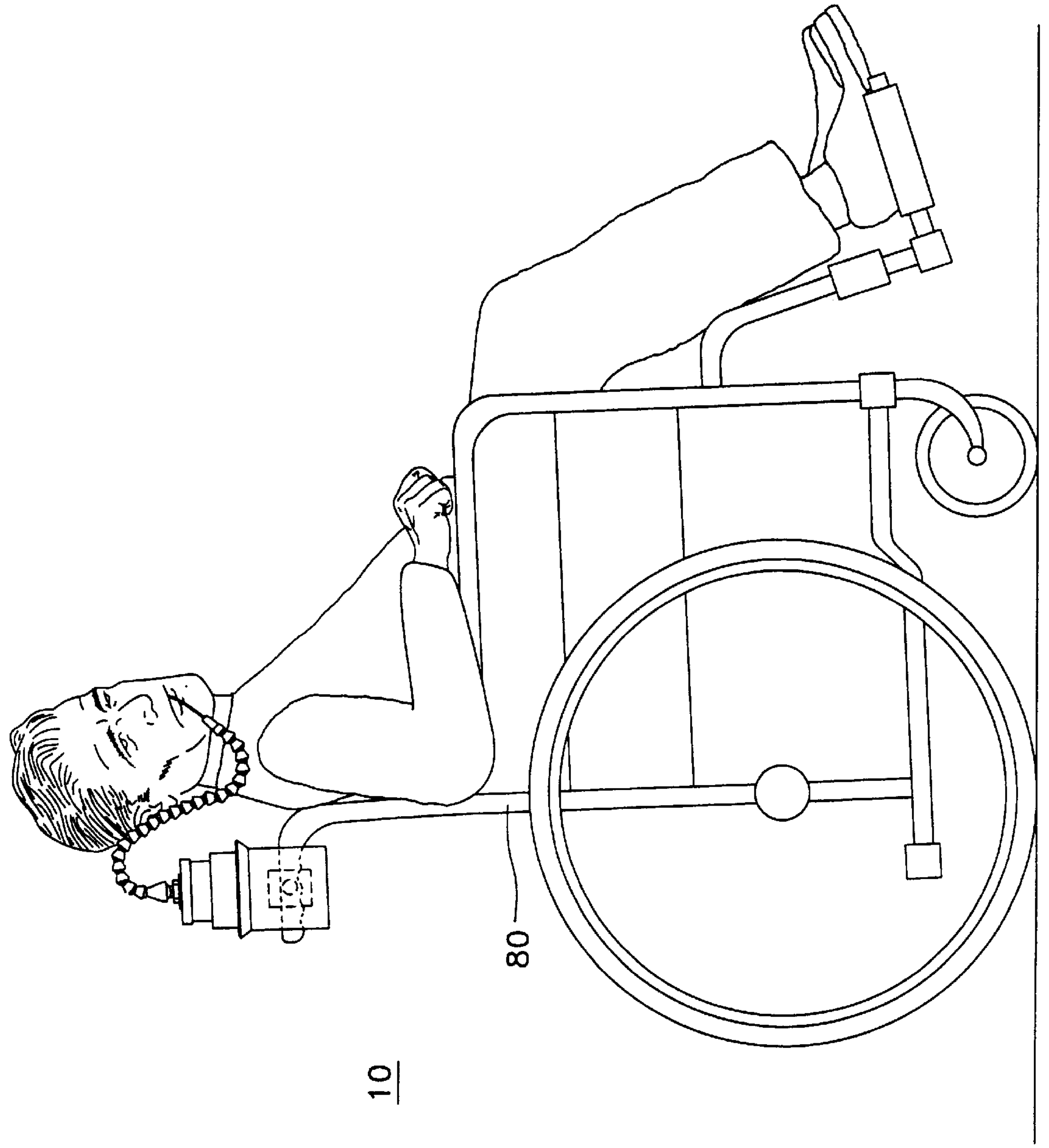
FIG. 1 illustrates an exemplary use of the drinking device according to the present invention.
Figure 2:
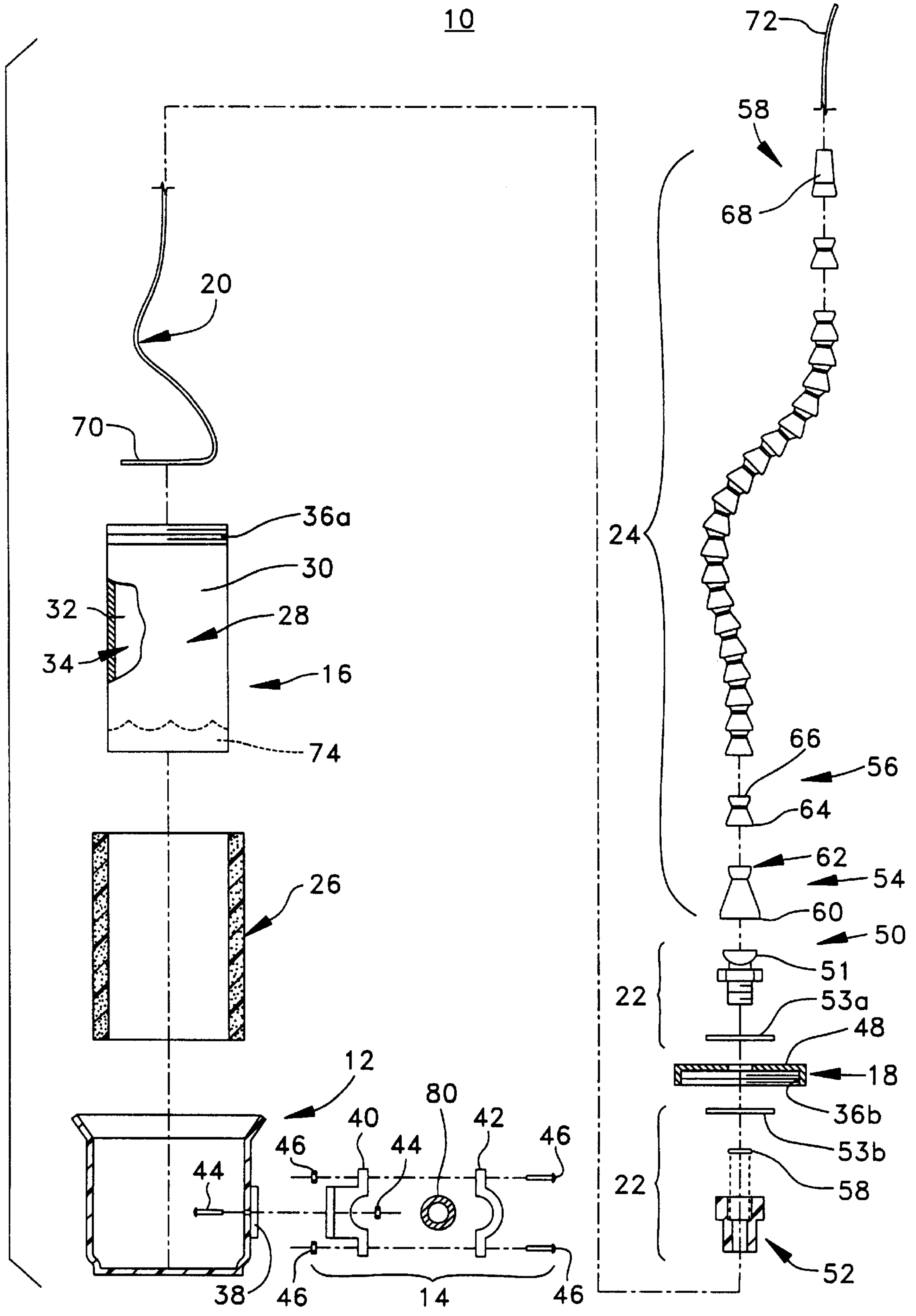
FIG. 2 is an exploded view of the drinking device according to the present invention.

Because the device enables a user to drink without using his hands to grasp the device, the present invention may be employed by persons with disabilities. Thus, an embodiment of the present invention is shown attached to a wheelchair for illustration. However, the present invention is not limited thereto and, accordingly, reference should be made to the appended claims, rather than to the specification herein, as indicating the scope of the invention. Now, referring to the drawings wherein like reference numerals designate corresponding structure throughout the views, and referring particularly to FIG. 1, a drinking device 10 in accordance with the present invention is provided. FIG. 2 shows an exploded view of the drinking device 10 in accordance with the present invention. The drinking device 10 includes a holder 12, a fastening member 14, a container 16, a lid 18, a flexible tube 20, a bulkhead connector 22, and a support assembly 24.

The holder 12 comprises a cylindrical cup that has a platform 38 on which the fastening member 14 attaches. In a preferred embodiment of the present invention, the fastening member 14 includes a circular clamp that is split into a first member 40 and a second member 42. The first clamp member 40 has a flat side that is held to the holder platform 38 by an assembly nut and bolt 44. The second clamp member 42 is attached to the first clamp member 40 around a structural member of a principle apparatus 80 by two clamp nuts and bolts 46. The first clamp member 40 may attach to the holder platform 38 at various orientations so as to enable upright attachment of the drinking device 10 to either horizontal, vertical, or obliquely oriented structural members of the principal apparatus 80.

The holder 12 and fastening member 14 are of the type supplied by Dyer Industries, Inc., Unit 3, 165 Fishermills Road, Cambridge, Ontario, N3E1E1, under Model Number 0505. In alternative embodiments of the present invention, the holder and fastening member may be of a different type, for example, a multiple hook and loop fastener sold under the trademark VELCRO or a system of straps (not shown). Moreover, for illustration, FIG. 2 shows the structural member of the principal apparatus 80 to be a horizontal tube. However, attachment of the drinking device 10 to a structural member that has other shapes and orientations is encompassed by this invention. Specifically, the structural member of the principal apparatus 80 may comprise a rail of a wheelchair, a rail or head board of a bed, a frame of a bicycle, a part of a chair, and an intravenous pole or wall that is positioned near the user, but is not limited thereto.

The container 16 includes a cylindrical wall 28, an outer surface 30, an inner surface 32, a chamber 34, and screw threads 36A near an open top. The chamber 34 holds a liquid 74. The lid 18 includes screw threads 36B that mate to the container screw threads 36A. In a preferred embodiment of the present invention, the container 16 is inserted into a compressible, cylindrical sleeve 26 that is inserted into the holder 12. The outer diameter of the sleeve 26 is larger than the inner diameter of the holder 12 so as to partially compress the sleeve 26. Such compression securely fastens the sleeve 26 and container 16 within the holder 12. The sleeve 26 also thermally insulates the container 16 to diminish heat transfer between the atmosphere and the liquid 74. In an other embodiment of the present invention, the sleeve 26 may be omitted (not shown). In such an alternative embodiment, the container 16 may be held by the holder 12 in a press fit.

A bulkhead connector assembly 22 is connected through an opening 48 in the center of the lid 18. The bulkhead connector assembly 22 includes a male threaded part 50, a female threaded part 52, an exterior gasket 53*a*, an interior gasket 53*b*, and an o-ring seal 58. The male part 50 extends through the opening 48 and is screwed into the female part 52. The o-ring 58 is conventionally disposed between the male part 50 and the female part 52. The exterior gasket 53*a* is held between the male part 50 and an exterior surface of the lid 18. The interior gasket 53*b* is held between the female part 52 and an interior surface of the lid 18. An end 51 of the male part 50 opposite the threads has a ball shape suitable for mounting to a one-half inch diameter socket, as is described hereinbelow.

In an embodiment of the present invention, the bulkhead connector assembly 22 permits air leakage through the opening 48 so as to enable equalization of pressure between the container interior and the atmosphere. In an alternative embodiment of the present invention, the male part 50 is screwed to a nut, thereby omitting the female threaded part 52 and the o-ring 58. Also, the interior gasket 53*b* may be eliminated. In yet another embodiment of the present invention, the lid 18 has a connector integrally formed as part of its top that connects directly to the support assembly 24, thereby eliminating the bulkhead connector 22.

The present invention encompasses any support assembly that deformably supports a flexible tube in a variety of configurations. One embodiment of the support assembly will now be described. The support assembly 24 attaches to the ball end 51 of the male part 50 of the bulkhead connector 22. The support assembly 24 includes an adapter 54, several segments 56, and a nozzle 58. The adapter 54 includes a one-quarter inch inside diameter ball end 62 and a one-half inch inside diameter socket end 60 that connects to the ball end 51 of the bulkhead connector 22. A one-quarter inch socket end 64 of a first one of the segments 56 connects to the adapter ball end 62. A one-quarter inch inside diameter ball end 66 of the first one of the segments 56 attaches to the socket end of an adjacent segment. Several segments 56, for example twenty, are sequentially connected to obtain a desired length of the support assembly 24. The overall length of the support assembly 24 will depend upon the specific application, as will be understood by those skilled in the art. The nozzle 56 has a one-quarter inch inside diameter socket end 68 for mating to a ball end of a last one of the segments 56. The nozzle 58, segment 56, adapter 54, and male part 50 are LOC-LINE ¼" round nozzle (part number 41404), ¼" segment (part number 41401), ¼" to ¼" adapter (part number 51821), and ½" N.P.T. connector (part number 51805), respectively, as supplied by Lockwood Products Inc., 5615 SW Willow Lane, Lake Oswego, Oreg. 97035.

A flexible tube 20 extends from the interior bottom of the container 16 and through a continuous passage within the bulkhead connector 22 and support assembly 24. An inlet end 70 of the tube 20 is disposed within the liquid 74. An outlet end 72 of the tube 20 extends beyond the support assembly 24. The tube 20 eliminates potential liquid leakage through the support assembly 24 and enables cleaning and replacing of the wetted surfaces.

Figure 3:
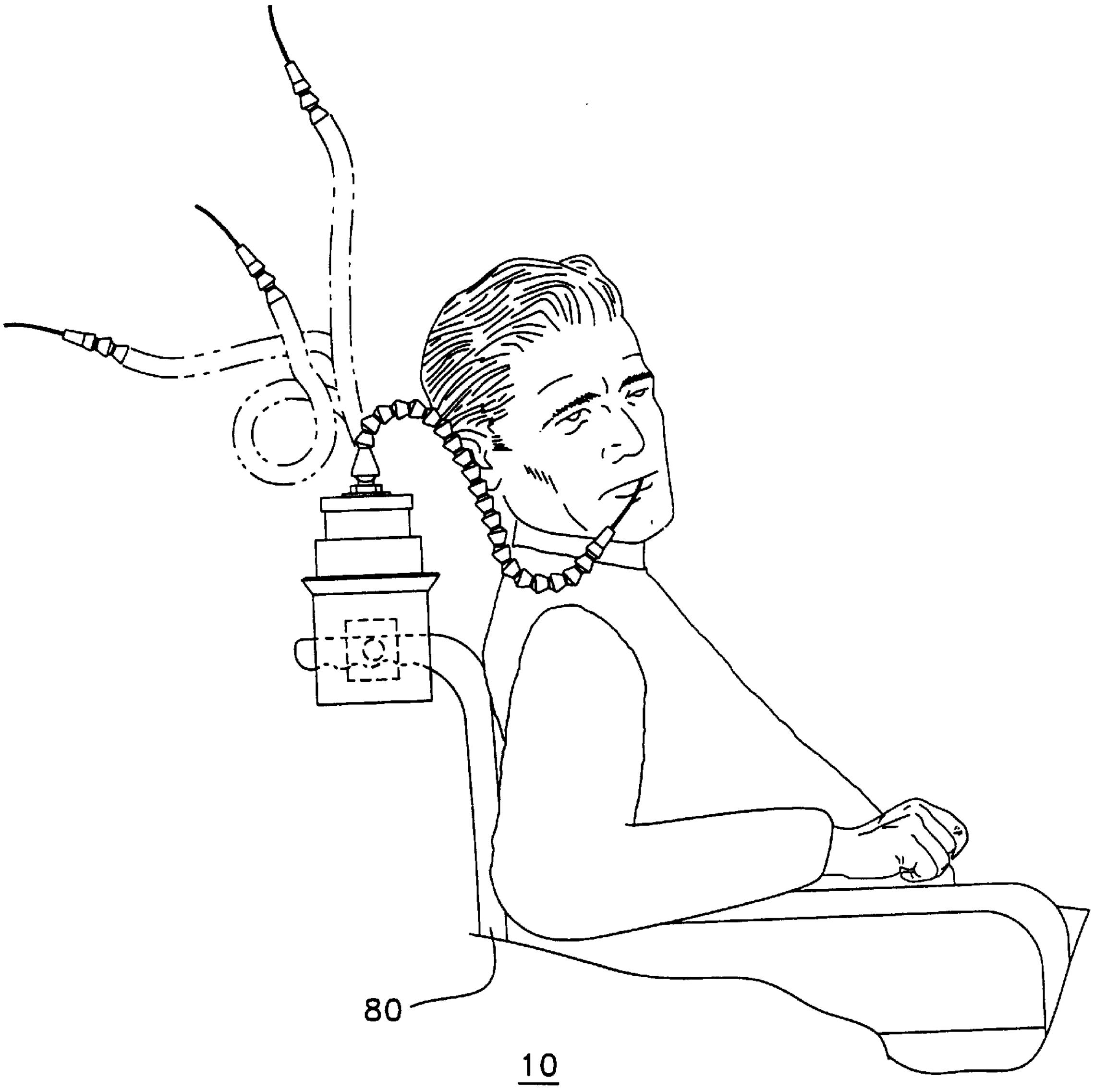
FIG. 3 illustrates an exemplary drinking device with various tube configurations shown in phantom.
Figure 4:
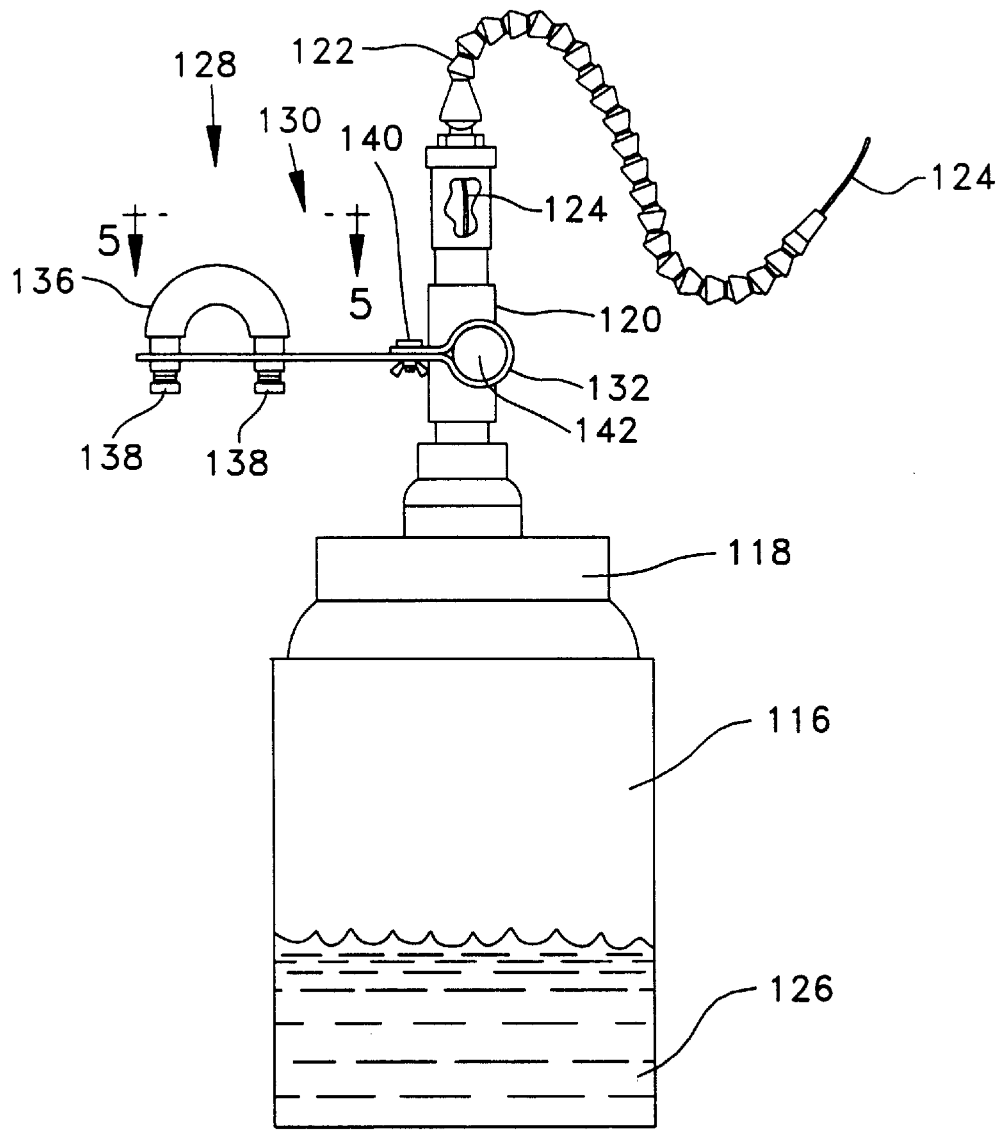
FIG. 4 (PRIOR ART)
FIG. 4 shows a prior art device.
Figure 5:
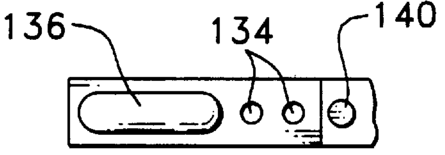
FIG. 5 shows a view of part of the prior art device.

In operation, the drinking device 10 is usually disposed on the principal apparatus 80 lower than the user's mouth. FIG. 3 illustrates such a disposition on a wheelchair. The holder 12 securely holds the container 16 by friction created by compressing the sleeve 26 against the container exterior surface 30. The support assembly 24 may be manipulated into an infinite variety of configurations, as shown in phantom in FIG. 3. Upon adjustment by an attendant, the support assembly 24 rigidly fixes the position of the tube outlet 72 adjacent the user's mouth. Thus, by only a small movement of the user's head or mouth, the user may draw by mouth suction upon the fluid 74 that is within the container 16. The combination of the support assembly 24, the fastening member 14, and the interference fit among the container 16, sleeve 26, and holder 12 provides a device that maintains the position of the outlet 72 adjacent the user's mouth despite vibrating and bumping that are common to wheelchairs, bicycles, and similar apparatus.

What is claimed is:

1. A device comprising:

a container having an outer wall that has an exterior surface, an interior surface that defines a chamber for holding a fluid, and at least one aperture defined by the outer wall and in communication with said chamber;

a holder having a fastening member for coupling the container to a principal apparatus, the outer wall of the container being releasably supported in the holder;

a conduit extending through said aperture into the chamber, said conduit having an outlet that is configured for a user to drink from;

support means for holding at least a portion of said conduit in a plurality of predetermined configurations and positions, said support means being adjustably deformable for locations said outlet at a desired location adjacent the mouth of said user and capable of hands-free access by the user's mouth; and a connector, disposed substantially across the aperture for coupling the support means and the container together and for supporting the support means from the container, the connector having:

an upper end for coupling to the support means; and a lower end for coupling to the container, the lower end comprising:

a male threaded member;

a female threaded member coupled to the male threaded member across the aperture; and a contact surface, disposed on at least one of the male threaded member and the female threaded member contacting a container surface in response to threading together the male threaded member and the female threaded member;

whereby the connector enables the conduit to pass therethrough and simultaneously retards a liquid disposed within the container from freely leaking therethrough.

2. The device of claim 1 wherein the container is frictionally disposed within the holder.

3. The device of claim 1 wherein the container further comprises a lid.

4. The device of claim 3 wherein the at least one aperture consist of one aperture being disposed within the lid.

5. The device of claim 1 further comprising a container lid having screw threads for receiving corresponding screw threads disposed on the container, whereby the lid is coupled to the cylinder by screwing theretogether.

6. The device of claim 1 wherein the fastening member comprises one of a screw clamp, a multiple hook and loop fastener, and a strap assembly.

7. The device of claim 1 further comprising a sleeve being disposed at least partially on the container exterior surface, the sleeve being at least partially compressed by the holder, whereby the sleeve and the container are held by the holder by friction therebetween.

8. The device of claim 7 wherein the sleeve comprises an insulating material such that the transfer of heat to or from the chamber is reduced.

9. The device of claim 7 wherein said sleeve comprises a compressible material.

10. The device of claim 1 wherein the connector comprises a bulkhead connector being coupled to the container adjacent to the aperture and coupled to the support means to support the support means from the container, the bulkhead connector defining a passage through which the conduit extends.

11. The device of claim 10 wherein the bulkhead connector includes an o-ring seal disposed at least partially between the male part and the female part.

12. The device of claim 10 wherein the conduit comprises a flexible tube, and said support means is coupled to said bulkhead connector.

13. The device of claim 10 wherein the support means comprises a support having a plurality of segments, each one of the segments having a first end and a second end, and each one of the segments defining a passage therethrough, whereby the first end of any one segment is coupled to the second end of an adjoining segment in such a manner as to form a substantially continuous passage.

14. The device of claim 10 wherein the support means further comprises:

an adapter having a ball end and a socket end, the adapter socket end being coupled to a ball end of the bulkhead connector;

a nozzle having a socket end and a straight end, at least a portion of the flexible tube protruding from the nozzle straight end;

a plurality of segments, each one of a plurality of segments having a ball end and a socket end, the socket end of a first one of said segments being coupled to the ball end of the adapter, the ball end of a last one of said segments being coupled to the socket end of the nozzle, the remainder of said segments being similarly coupled together therebetween in such a manner as to form a continuous chain of segments; and, each one of the segments, the nozzle, and the adapter defining a passage therethrough for receiving a flexible tube.

15. The device of claim 14 wherein the passages through each one of the segments, the nozzle, and the adapter ball end have a circular cross section of at least 0.25 inches diameter; and the adapter socket end and the bulkhead ball end have a circular cross section of at least 0.5 inches diameter.

16. The device of claim 1 wherein said conduit comprises a flexible tube.

17. The device of claim 1 wherein the contact surface comprises a flange integrally formed in the female threaded member and a flat surface formed in the male threaded member, the male member flat surface and the female member flange surface pressing on opposing sides of the container surface to couple the connector to the container.

18. The device of claim 1 wherein the connector comprises a socket disposed at the connector upper end for mating to a ball end of the support means, and the male threaded member protrudes through the aperture.

19. A system for delivering liquids comprising:

a principal apparatus for providing support for said system;

a container having an outer wall that has an interior surface that defines a chamber for holding a fluid and at least one aperture defined by the outer wall and in communication with said chamber;

a holder having a fastening member for coupling the container to the principal apparatus, the outer wall of the container being releasably supported in the holder;

a conduit extending through said aperture into the chamber, said conduit having an outlet that is configured for a user to drink from;

a support for holding at least a portion of said conduit in a plurality of predetermined configurations and positions, said support being adjustably deformable for locating said outlet at a fixed location adjacent the mouth of said user; and a connector, disposed substantially across the aperture, for coupling the support and the container together and for supporting the support from the container, the connector having:

an upper end for coupling to the support; and a lower end for coupling to the container, the lower end comprising:

a male threaded member;

a female threaded member coupled to the male threaded member across the aperture; and a contact surface, disposed on at least one of the male threaded member and the female threaded member, contacting a container surface in response to threading together the male threaded member and the female threaded member;

whereby the connector enables the conduit to pass therethrough and simultaneously retards a liquid disposed within the container from freely leaking therethrough.

20. The mechanical system of claim 19 wherein the principal apparatus comprises at least one of a wheelchair, a bed, a bicycle, an intravenous pole, a wall, and a chair.

21. A method of providing a fluid to a user's mouth comprising the steps of:

providing a container having an outer wall that has an exterior surface, an interior surface that defines a chamber for holding a fluid, and a least one aperture defined by the outer wall and in communication with said chamber; a holder having a fastening member for coupling the container to a principal apparatus, the outer wall of the container being releasably supported in the holder; a conduit extending through said aperture into the chamber, said conduit having an outlet that is configured for a user to drink from; support means for holding at least a portion of said conduit in a plurality of predetermined configurations and positions, said support means being adjustably deformable for locating said outlet at a desired location adjacent the mouth of said user and capable of hands-free access by the user's mouth; and a connector, disposed substantially across the aperture, for coupling the support means and the container together and for supporting the support means from the container, the connector having: an upper end for coupling to the support means; and a lower end for coupling to the container, the lower end comprising: a male threaded member; a female threaded member coupled to the male threaded member across the aperture; and, a contact surface, disposed on at least one of the male threaded member and the female threaded member, contacting a container surface in response to threading together the male threaded member and the female threaded member; whereby the connector enables the conduit to pass therethrough and simultaneously retards a liquid disposed within the container from freely leaking therethrough;

coupling said device to a principal apparatus;

deforming said support means to a fixed configuration so as to position the outlet of said conduit adjacent said user's mouth, thereby enabling the user to access said outlet by moving at least one of the user's head and mouth; and drawing the fluid from the container into the user's mouth by suction supplied by the user.

* * * * *